United States Patent Office 3,753,985
Patented Aug. 21, 1973

3,753,985
3-AMINO-FLAVANONES
John Joseph Gavin, Hamden, and Herman Henry Walchli, Jr., West Haven, Conn., and Dale Adrian Stauffer, Elkhart, Ind., assignors to Miles Laboratories, Inc., Elkhart, Ind.
No Drawing. Filed Dec. 28, 1970, Ser. No. 102,181
Int. Cl. C07d 7/20
U.S. Cl. 260—247.7 G        3 Claims

ABSTRACT OF THE DISCLOSURE

A group of flavanone derivatives of the structural formula

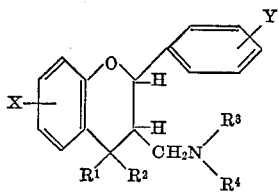

in which $R^1$ is hydrogen, $R^2$ is OH or O (lower)acyl, or $R^1R^2$ taken together are O, $R^3$ is H or (lower)alkyl, $R^4$ is H or (lower)alkyl or $NR^3R^4$ is a heterocyclic moiety of six members, X is a halogen, (lower)alkyl or (lower) alkoxy, and Y is a halogen, (lower)alkyl, or (lower)alkoxy; a process for preparing such compounds; and a process for inhibiting the growth of microorganisms.

BACKGROUND OF THE INVENTION

It has been known that various chemicals may be used to inhibit the growth of microorganisms such as yeast and molds. Although it would be desirable to have a single chemical that would inhibit the growth of all undesirable microorganisms, such a chemical has not been available. Therefore, to effectively inhibit and combat infestations of these microorganisms, it has been the practice to combine several chemicals to provide the desired relief.

Such mixtures of chemicals are often successful in their attack upon these microorganisms. However, side reactions may develop from sensitivity to one or more of the chemicals included in the mixture. Also, strains of yeasts and molds may develop that are resistant to the chemicals which are repeatedly used in the treatment thereof, thereby decreasing or eliminating the inhibition capabilities of these chemicals.

SUMMARY OF THE INVENTION

This invention relates to a novel series of chemical compounds and a new process for inhibiting the growth of microorganisms. Also, this invention relates to a process for the preparation of the novel compounds of this invention. More particularly, this invention relates to a series of flavanone derivatives which has been found especially useful for inhibiting the growth of yeasts and molds such as Trichophyton mentagrophytes and Candida albicans.

Compounds of this invention may be represented by the general structural formula:

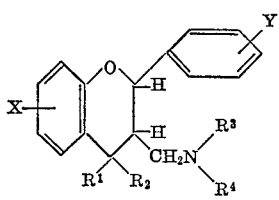

in which $R^1$ is hydrogen, $R^2$ is OH or O(lower)acyl, or $R^1R^2$ taken together are O, $R^3$ is H or (lower)alkyl, $R^4$ is H or (lower)alkyl or $NR^3R^4$ is a heterocyclic moiety of six members, X is a halogen, (lower)alkyl or (lower) alkoxy, and Y is a halogen, (lower)alkyl or (lower) alkoxy. Preferably, in this invention the (lower)acyl, (lower) alkyl and (lower)alkoxy consist of from 1 to 5 carbon atoms inclusive. The heterocyclic moieties are advantageously selected from morpholino, piperidino, piperazino and similar six membered rings. The halogen included in this structure is advantageously selected from chlorine, bromine or fluorine.

The compounds of this invention may be prepared according to a series of chemical reactions in which final products may be selectively separated from the reaction mixture or further reacted without separation to form other final products. This sequence is initiated by a Mannich reaction involving a flavanone, formaldehyde and a primary, secondary or tertiary amine. The resulting 3-substituted flavanone may then be separated or the reaction continued by a reduction of this product in the presence of a suitable catalyst to form a 3-substituted flavan-4-ol. This final product may be separated if desired or be allowed to remain in solution and be acylated to form a 3-aminoalkyl-4-acyloxyflavan. Any of the above final products may be reacted according to known procedures to form acid addition salts thereof and preferably to form pharmacologically acceptable acid addition salts thereof. This synthesis may be graphically represented by the following chemical equation:

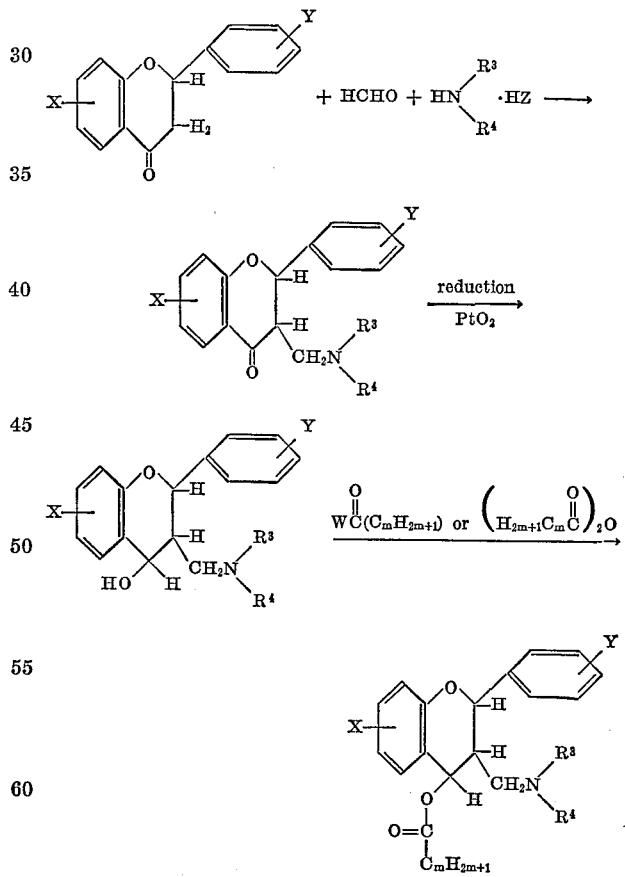

In this equation Z and W are halogens which may be the same or different and m is an integer from 1 to 4 inclusive.

The growth of microorganisms is effectively inhibited according to the process of this invention by exposure of the microorganism to a compound selected from the group described above. The means by which the organism is inhibited is not considered critical and will depend upon the nature of the organism, the area of infestation and the host which is affected thereby. Typically, inhibition may be achieved by topical application of compounds of this invention. In other situations a systemic action may be achieved with an oral or injectable dosage form. Typically, these compounds may be included in powders, ointments, lotions, creams, solutions, suspensions, suppositories or other forms suitable for contacting the microorganism. The quantity of active compounds required for treating an infestation may vary according to the status of the microorganism, extent of infestation and the susceptibility of the microorganism to compounds of this invention.

PREFERRED EMBODIMENTS—SYNTHESIS OF COMPOUNDS

EXAMPLE 1

3-(4-morpholinylmethyl)flavanone hydrochloride

A mixture of flavanone (112.1 g., 0.5 mole), morpholine hydrochloride (61.6 g., 0.5 mole), 95% paraformaldehyde (31.6 g., 1 mole), 250 ml. of 2-propanol and 25 drops of concentrated hydrochloric acid was heated to reflux. After about 15 minutes most of the solid material had dissolved. Then crystals began to form, and after 5-10 minutes a copious precipitate was present. The mixture was cooled and diluted with dry ether. The salt was collected, washed with ether and dried. The crude material was agitated for 10 minutes with 500 ml. of boiling 2-propanol. Much of the solid material remained undissolved. The white salt was filtered from the hot mixture and washed with 2-propanol. Yield (88.3 g.), M.P. 172-3° C.

The filtrate and washings were concentrated by evaporation, and the residue was diluted with dry ether. The solid material thus obtained was mixed with 200 ml. of hot 2-propanol. The insoluble solid material was collected and washed with 2-propanol. This second crop of the white crystalline salt amounted to 17.2 g. M.P. 171-2° C. Total yield 105.5 g.

Analysis.—Calcd. for $C_{20}H_{21}NO_3 \cdot HCl$ (percent): HCl, 10.13, N (basic), 3.89; N (total), 3.89. Found (percent): HCl, 10.05; N (basic), 3.89; N (total), 3.89.

EXAMPLE 2

3-(dimethylaminomethyl)-flavanone hydrochloride

A mixture of flavanone (44.9 g., 0.2 mole), dimethylamine hydrochloride (16.3 g., 0.2 mole), 95% paraformaldehyde (9.5 g., 0.3 mole), 100 ml. of 2-propanol and 10 drops of concentrated hydrochloric acid was heated under reflux for 1 hour. Then another 4.8 g. (0.15 mole) of paraformaldehyde was rinsed in the 25 ml. of 2-propanol, and the heating was continued for 2 hours longer. The solvent was removed by distillation under reduced pressure and the syrupy residue was shaken with 150 ml. of ether and 150 ml. of water. The aqueous portion was separated and treated with excess potassium carbonate. The syrupy free base was taken-up in ether, and the extract was dried over magnesium sulfate. The dried ether solution was treated with an excess of ethereal hydrogen chloride. A sticky salt separated out which was washed by decantation with ether. The crude salt was dissolved in hot ethyl acetate, and the solution was clarified by filtration. Concentration by evaporation and dilution with dry ether gave the white crystalline salt. Yield (14.6 g.) M.P. 165-6° C. (decomp.).

Analysis.—Calcd. for $C_{18}H_{19}NO_2 \cdot HCl$ (percent): HCl, 11.47; N (basic), 4.41; N (total), 4.41. Found (percent): HCl, 11.33; N (basic), 4.35; N (total), 4.42.

EXAMPLE 3

3-(dimethylaminomethyl)flavan-4-ol

A mixture of 3-(dimethylaminomethyl)flavanone hydrochloride (13.7 g., 0.043 mole) (cf. Example 2) 0.2 g. of platinum oxide catalyst and 200 ml. of methanol was shaken under an initial hydrogen pressure of 50 pounds. The mixture was shaken overnight and somewhat more than the theoretical quantity of hydrogen required to reduce the carbonyl group was absorbed. The catalyst was removed by filtration and washed with 2-propanol. Then the solvents were removed from the filtrate and washings by distillation under reduced pressure. The syrupy residue was taken up in 200 ml. of water, and the solution was washed by shaking with a little ether. The free base was liberated by the addition of excess potassium carbonate. The solid material was collected, washed with water and recrystallized from aqueous ethanol. Yield (9.8 g.) M.P. 157-8° C.

Analysis.—Calcd. for $C_{18}H_{21}NO_2$ (percent): N (basic), 4.94; N (total), 4.94. Found (percent): N (basic), 4.91; N (total), 4.96.

EXAMPLE 4

3-(dimethylaminomethyl)flavan-4-ol-hydrochloride

The free basic (12.5 g.) prepared according to Example 3 was dissolved in 100 ml. of warm 2-propanol, and an excess of ethereal hydrogen chloride was added. Then the mixture was diluted with dry ether. The salt was collected, washed with ether and recrystallized from a mixture of methanol and 2-propanol. The white crystals amounted to 12.3 g. The filtrate and washings were concentrated by evaporation and diluted with dry ether to give an additional 1.2 g. of the salt. Yield 13.5 g., M.P. 224-5° C.

Analysis.—Calcd. for $C_{18}H_{21}NO_2 \cdot HCl$ (percent): HCl, 11.40; N (basic), 4.38; N (total), 4.38. Found (percent): HCl, 11.30; N (basic), 4.27; N (total), 4.42.

EXAMPLE 5

3-(4-morpholinylmethyl)flavan-4-ol

A mixture of 3-(4-morpholinylmethyl)flavanone hydrochloride (16.0 g., 0.045 mole) (cf. Example 1), 0.2 g. of platinum oxide catalyst and 200 ml. of methanol was shaken under an initial hydrogen pressure of 50 pounds. After shaking for 24 hours, slightly more than theoretical quantity of hydrogen required to reduce the carbonyl group was taken-up. The catalyst was removed by filtration and washed with 2-propanol. The solvent was removed from the filtrate and washings by distillation under reduced pressure. The syrupy residue was taken-up in 200 ml. of water, and the solution was washed by shaking with a little ether. Then excess potassium carbonate was added. The solid free base was collected, washed with water and recrystallized from aqueous ethanol. Yield (11.0 g.), M.P. 182-3° C.

Analysis.—Calcd. for $C_{20}H_{23}NO_3$ (percent): N (basic), 4.31; N (total), 4.31. Found (percent): N (basic), 4.25; N (total), 4.33.

EXAMPLE 6

3-(4-morpholinylmethyl)flavan-4-ol hydrochloride

The free base (10.5 g.) prepared in Example 5 was dissolved in 300 ml. of boiling 2-propanol, and excess 2-propanolic hydrogen chloride was added. Then the mixture was concentrated by evaporation. The white crystals which formed on cooling were collected and washed with 2-propanol. Yield (9.1 g.) M.P. 205-6° C. (decomp.)

Analysis.—Calcd. for $C_{20}H_{23}NO_3 \cdot HCl$ (percent): HCl, 10.08; N (basic), 3.87; N (total), 3.87. Found (percent): HCl, 9.95; N (basic), 3.84; N (total), 3.89.

EXAMPLE 7

3-(4-morpholinylmethyl)-4-propionoxyflavan hydrochloride 3-(4-morpholinylmethyl)flavan-4-ol (14.9 g., 0.046 mole) (cf. Example 5) was dissolved in 100 ml. of chloroform and propionyl chloride (8.5 g., 0.092 mole) was added. The solution became quite warm. After the mixture had cooled to room temperature it was heated under gentle reflux for two hours. The solvent was removed by distillation under reduced pressure, and the solid residue was dissolved in aqueous ethanol. The mixture was clarified with carbon, and most of the ethanol was removed by evaporation. The crystals which formed on cooling were collected and washed with water. A beige colored salt was collected. Yield (10.0 g.) M.P. 192–3° C.

Analysis.—Calcd. for $C_{23}H_{27}NO_4 \cdot HCl$ (percent): HCl, 8.72; N (basic), 3.35; N (total), 3.35. Found (percent): HCl, 8.57; N (basic), 3.39; N (total), 3.35.

PHARMACOLOGICAL EVALUATION

EXAMPLE 8

The ability of the compounds of this invention to inhibit the growth of *Trichophyton mentagrophytes* was determined in the following manner: A spore suspension was prepared and standardized to contain approximately 1,000,000 spores per milliliter in 0.9% saline. To each of a series of tubes containing 0.9 ml. of serial two-fold dilutions of the compound to be tested in Sabouraud's broth, 0.1 ml. of the above suspension was added. The Sabouraud's broth had the following composition, expressed in grams per liter of distilled water.

TABLE 1

| | |
|---|---|
| Pancreatic digest of casein | 5.0 |
| Peptic digest of animal tissue | 5.0 |
| Dextrose | 20.0 |

Having a final pH of 5.7±0.1.

The dilution series ranged downward from 50 mcg. per ml. The tubes were incubated at 37° C. and observed for the presence of or absence of growth at the time intervals set forth in Table 2. The endpoint was taken as that tube in which growth was completely inhibited as evidenced by absence of turbidity. Control tubes containing standard antibiotics and tubes without inhibitory substances were included for comparative purposes.

TABLE 2

| | Minimum inhibitory concentration, mcg./ml. | | | |
|---|---|---|---|---|
| Time, hours | 24 | 48 | 72 | 96 |
| Compound: | | | | |
| 3-(4-morpholinylmethyl)-flavanone hydrochloride (Compound A) | 12.5 | 25 | 50 | >50 |
| 3-(dimehtylaminomethyl)-flavanone hydrochloride (Compound B) | 10 | 20 | 30 | |
| 3-(dimethylaminomethyl)-flavan-4-ol hydrochloride (Compound C) | 25 | 50 | | |

The minimum inhibitory concentration of Griseofulvin for this spore concentration at 72 hours was 1.9–2.1 mcg./ml.

The effect observed in this example demonstrated that the compounds of this invention are effective inhibitors of the growth of microorganisms. This is supported by the comparison of the minimum inhibitory concentration of these compounds with the widely used medication Griseofulvin.

EXAMPLE 9

The ability of the compounds of this invention to inhibit the growth of *Candida albicans* was determined in the following manner. A cell suspension was prepared and standardized to contain approximately 1,000,000 cells per milliliter in 0.9% saline. 0.1 ml. of this suspension was added to each of a series of tubes containing 0.9 ml. of serial two-fold dilutions of the compound being tested in Eugon Broth having the following composition expressed in grams per liter of distilled water.

TABLE 3

| | |
|---|---|
| Pancreatic digest of casein | 15.0 |
| Papaic digest soya meal | 5.0 |
| Sodium chloride | 4.0 |
| Sodium sulfite | 0.2 |
| L-cystine | 0.7 |
| Dextrose | 5.5 |

Having a final ph of 7.0±0.1.

The dilution series ranged downward from 50 mcg. per ml. The tubes were incubated at 37° C. and observed for the presence or absence of growth at the time intervals set forth in Table 4. The endpoint was taken as that tube in which growth was completely inhibited as evidenced by the absence of turbidity. Control tubes containing standard antibiotics and tubes without inhibitory substances were included for comparison.

TABLE 4

| | Minimum inhibitory concentration, mcg./ml | | | |
|---|---|---|---|---|
| Time, hours | 24 | 48 | 72 | 96 |
| Compound: | | | | |
| A | 12 | 12 | 12 | 12 |
| B | 10 | 10 | 20 | |
| C | 42 | 42 | 50 | |

The minimum inhibitory concentration of Nystatin for this cell concentration at 72 hours was 2–10 mcg./ml.

The effects observed in this example demonstrated that the compounds of this invention are effective inhibitors of the growth of microorgaisms. This is particularly true when the minimum inhibitory concentration of the new compounds is compared with widely used medication Nystatin.

EXAMPLE 10

The oral toxicity of the compounds of this invention was determined by administration thereof to rats. Groups of rats were randomly selected and respectively received, orally, graduated doses of the new compounds in a saline solution. Following administration, the animals were observed for side effects and death. From the observed deaths, an $LD_{50}$ (dose at which death occurred in 50% of the animals tested) was calculated which is set forth in Table 5. A control group of rats received a corresponding quantity of saline solution.

EXAMPLE 11

The toxicity of these compounds when administrated intraperitoneally was determined in mice. Groups of mice were randomly selected and respectively received, intraperitoneally, graduated doses of the new compounds in a saline solution. An equal quantity of saline solution was administered to a group of mice for control purposes. After administration, the animals were observed for side reactions and death. From the observed deaths an $LD_{50}$ was calculated which is set forth in Table 5.

TABLE 5

| Compound | Rat (oral) mg./kg. | Mouse (i.p.) mg./kg. |
|---|---|---|
| A | 891 | 355 |
| B | 681 | 100 |
| C | 215 | 21.5 |

What is claimed is:
1. A compound selected from the group consisting of compounds of the formula:

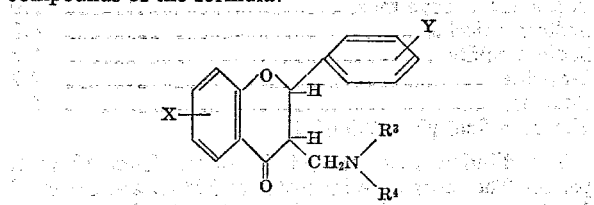

in which $R^3$ is H or (lower)alkyl, $R^4$ is H or (lower)alkyl, or $NR^3R^4$ is morpholino, piperazino, pyrrolidino or piperidino, X is H, halogen, (lower)alkyl or (lower)alkoxy, and Y is H, halogen, (lower)alkyl, or (lower)alkoxy; or pharmacologically acceptable salts thereof.

2. A compound according to claim 1 which is 3-(4-morpholinylmethyl)flavanone.

3. A compound according to claim 1 which is 3-(dimethylaminomethyl)flavanone.

References Cited
UNITED STATES PATENTS

| | | | |
|---|---|---|---|
| 2,744,919 | 5/1956 | Kurth | 260—345.2 |
| 2,744,920 | 5/1956 | Kurth | 260—345.2 |
| 2,764,596 | 9/1956 | Avakian et al. | 260—345.2 |
| 2,890,225 | 6/1959 | Gregory | 260—345.2 |
| 3,410,851 | 11/1968 | Stauffer | 260—345.2 |

ALEX MAZEL, Primary Examiner

J. TOVAR, Assistant Examiner

U.S. Cl. X.R.

260—268 BC, 293.58 326.5 D, 345.2; 424—283